United States Patent
Li et al.

(10) Patent No.: US 9,958,169 B2
(45) Date of Patent: May 1, 2018

(54) GROUND SOURCE HEAT PUMP INTEGRATED CONTROLLER AND METHOD OF ACHIEVING SAME

(71) Applicant: BEIJING HECHUANG SANZEN ENERGY TECH. STOCK CORPORATION, Fengtai District, Beijing (CN)

(72) Inventors: HongXia Li, Beijing (CN); BaoXiang Chen, Beijing (CN)

(73) Assignee: BEIJING HECHUANG SANZEN ENERGY TECH. STOCK CORPORATION, Beijing (CN)

( * ) Notice: Subject to any disclaimer, the term of this patent is extended or adjusted under 35 U.S.C. 154(b) by 159 days.

(21) Appl. No.: 14/888,382

(22) PCT Filed: Sep. 26, 2014

(86) PCT No.: PCT/CN2014/087526
§ 371 (c)(1),
(2) Date: Oct. 30, 2015

(87) PCT Pub. No.: WO2015/062381
PCT Pub. Date: May 7, 2015

(65) Prior Publication Data
US 2016/0123604 A1    May 5, 2016

(30) Foreign Application Priority Data
Oct. 29, 2013    (CN) .......................... 2013 1 0528371

(51) Int. Cl.
*F24D 19/10*    (2006.01)
*F24D 3/18*    (2006.01)
(Continued)

(52) U.S. Cl.
CPC ........... *F24D 19/1006* (2013.01); *F24D 3/18* (2013.01); *F24D 19/1039* (2013.01);
(Continued)

(58) Field of Classification Search
CPC .... F25D 3/18; F25D 19/1006; F25D 19/1039; F25D 2200/123; F24F 5/0046;
(Continued)

(56) References Cited

U.S. PATENT DOCUMENTS

2006/0168611 A1    7/2006  Fima
2010/0223171 A1*   9/2010  Baller ................. F24D 19/1048
                                              705/34
(Continued)

FOREIGN PATENT DOCUMENTS

CN    201803541 U    4/2011
CN    202109616 U    1/2012
(Continued)

OTHER PUBLICATIONS

International Search Report dated Dec. 31, 2014 in International Application No. PCT/CN2014/087526, filed Sep. 26, 2014.
(Continued)

*Primary Examiner* — Marc Norman
(74) *Attorney, Agent, or Firm* — Hauptman Ham, LLP

(57) ABSTRACT

A ground source heat pump integrated controller includes a main module that has pre-integrated multiple main machines, pumps and valves according to the rated load of the main module, and a number of extended modules that have pre-integrated multiple main machines, pumps and valves according to a rated load of the extended modules. The main module and extended modules both are provided with a plurality of analog contacts and digital contacts, and the extended modules are connected, via the analog and digital contacts, to the main module according to the rated (Continued)

load of the ground source heat pump system. The advantage of the ground source heat pump integrated controller lies in that after system load is calculated according to floor area, multiple extended modules are connected to one main module, which increases the capacity of the main module and thus meets the requirement of system load.

8 Claims, 6 Drawing Sheets

(51) Int. Cl.
    *F24F 5/00*     (2006.01)
    *F25B 30/06*     (2006.01)
    *F25B 49/00*     (2006.01)

(52) U.S. Cl.
    CPC ...... *F24F 5/0046* (2013.01); *F24D 2200/123* (2013.01); *F25B 30/06* (2013.01); *F25B 49/00* (2013.01); *F25B 2400/06* (2013.01); *Y02A 30/272* (2018.01); *Y02B 10/20* (2013.01); *Y02B 10/24* (2013.01)

(58) Field of Classification Search
    CPC ...... F25B 30/06; F25B 49/00; F25B 2400/06; Y02B 10/20; Y02B 10/24; Y02B 10/40; F24D 3/18; F24D 19/1006; F24D 19/1039; F24D 2200/12344
    See application file for complete search history.

(56) References Cited

U.S. PATENT DOCUMENTS

| | | | |
|---|---|---|---|
| 2014/0236366 A1 | | 8/2014 | Livadaras et al. |
| 2015/0113987 A1* | | 4/2015 | Mackler et al. ........ H02S 20/23 60/641.2 |

FOREIGN PATENT DOCUMENTS

| | | | | |
|---|---|---|---|---|
| CN | 202501599 U | * | 10/2012 | |
| CN | 202547023 U | * | 11/2012 | |
| CN | 102980275 A | | 3/2013 | |
| CN | 103557652 A | | 2/2014 | |
| CN | 203672015 U | | 6/2014 | |
| CN | 204358880 U | * | 5/2015 | |
| CN | 204759243 U | * | 11/2015 | |
| JP | 2009198102 A | | 9/2009 | |
| WO | 2013053014 A1 | | 4/2013 | |

OTHER PUBLICATIONS

Supplementary European Written Opinion and Search Report, European Application No. EP 14 85 9045, dated Apr. 26, 2017, 12 pp.

* cited by examiner

GROUND SOURCE HEAT PUMP INTEGRATED CONTROLLER AND METHOD OF ACHIEVING SAME

RELATED APPLICATIONS

The present application is a National Phase of International Application Number PCT/CN2014/087526, filed Sep. 26, 2014, and claims priority from China Application Number 201310528371.2, filed Oct. 29, 2013.

FIELD OF THE INVENTION

The present invention relates to the field of ground source heat pumps, and more specifically, to a ground source heat pump integrated controller and the method of achieving the same.

BACKGROUND OF THE INVENTION

Ground source heat pump is an air conditioning system that adopts the principle of heat pumps to supply both cold air and heat by utilizing the solar energy and geothermal energy absorbed by the soil and shallow water sources (such as groundwater, river water and lake water) in the earth's surface. Using only a small amount of high-grade energy (electricity), ground source heat pump systems can realize the transfer of energy from a low-temperature heat source to a high-temperature heat source. During the ground source heat pump operation process, geothermal energy is used as the heat source of heat pumps for supplying heat in winter and as cold source of heat pumps for supplying cold air in summer. That is to say, in winter heat is taken out from geothermal energy, heated up and then supplied to indoor spaces to keep indoor temperature warm; in summary, however, heat is taken out from indoor spaces and released into geothermal energy.

The load of traditional ground source heat pump systems is calculated according to the floor area of the building. After the load is calculated, multiple main machines, pumps and valves are configured to meet the load, and then these main machines, pumps and valves are connected, via analog contacts and digital contacts, to a programmable controller for centralized control.

For each ground source heat pump system, however, after the system load is calculated, the programmable controller has to be programmed and its scalability is not good enough. Worse still, the types of communication ports are very limited and inflexible.

SUMMARY

The purpose of the present invention is to overcome the drawbacks of the prior art and provide a ground source heat pump integrated controller and the method of its embodiment, which does not require additional programming and thus achieves better scalability and flexibility.

The Technical Scheme of the Present Invention is:

A ground source heat pump integrated controller, characterized in that it comprises a main module that has pre-integrated multiple main machines, pumps and valves according to the rated load of the main module and a number of extended modules that have pre-integrated multiple main machines, pumps and valves according to the rated load of the extended modules, said main module and extended modules both being provided with a plurality of analog contacts and digital contacts, and said extended modules being connected, via the analog and digital contacts, to the main module according to the load of the ground source heat pump system.

Said main module is provided with a motherboard which is connected to the main module communication port which is then connected to the extended module communication port.

Said main module is provided with a memory unit which is connected to the motherboard for storing the operation data of the ground source heat pump integrated controller.

Said main module communication port is connected to a human-machine interaction device, whose functions include displaying the system graph parameter interface, detailed data monitoring interface, data curves, parameter modifications, energy consumption analysis, and working condition strategies.

Said main module is also provided with a wireless communication module which is connected to the motherboard.

Said main module is able to monitor the main machine, air conditioning pump (frequency conversion), ground source water pump, switch valve, electric proportional regulating valve and sensor.

The main module is able to integrate and monitor two main machines, three air conditioning pumps and three ground source water pumps. If more than two main machines are in use on the site, for each additional main machine, air conditioning pump and ground source heat pump, monitoring can be realized by introducing one additional extended module.

NUMBERING OF COMPONENTS IN THE ATTACHED DRAWINGS

Figure 1:
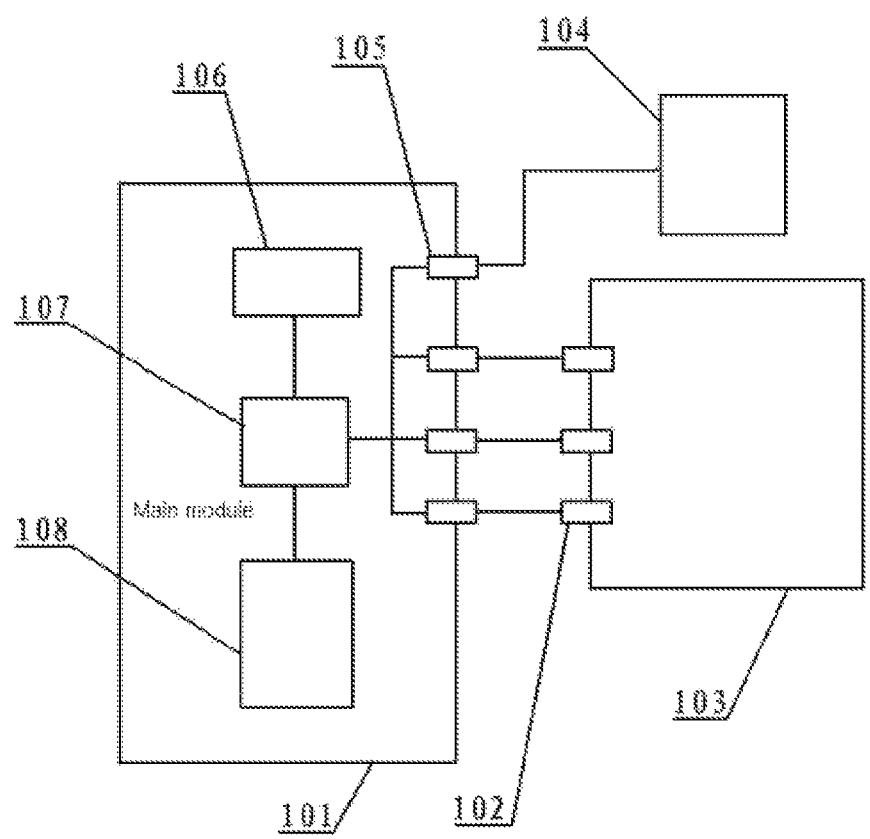
FIG. 1 is a block diagram of the ground source heat pump integrated controller system of the present invention.

101: Main module
102: Extended module communication port
103: Extended module
104: Human-machine interaction device
105: Main module communication port
106: Memory unit
107: Motherboard
108: Wireless communication module
201: User side
202: Ground source side
User side circulating pump set C;
Ground source side circulating pump set D
Main machine A; chilled water inlet A1; chilled water outlet A2; cooling water inlet A3; cooling water outlet A4;

Main machine B; chilled water inlet B1; chilled water outlet B2; cooling water inlet B3; cooling water outlet B4;
Electric valves YM1, YM2, YM3 and YM4;
Electric proportional regulating valve E;
Butterfly valves 1, 2, 3, 4, 5, 6, 7 and 8;
Pressure gauges P1, P2, P3 and P4;
Temperature sensors T1, T2, T3, T4 and T5;
Extended main machine H;
Extended electric valves YM5 and YM6;
Cooling water outlet H4; chilled water outlet H2.
401: Main program starts
402: Does present condition allow start?
403: Does present user side return water temperature meet the condition for main machine to be started?
404: Does the running equipment have any fault?
405: Is there any other equipment that can be started at present?
406: Main machine start program is invoked
407: Main program ends
418: Main machine stop program is invoked
419: Is there any standby equipment that can be started to replace the fault equipment?
410: Standby equipment is started
501: Main machine start program starts
502: Select the main machine whose running time is shorter and start the electric valves that correspond to it
503: Have the electric valves opened to the preset position?
504: Start the user-side circulating pump whose running time is the shortest
505: Has the user-side circulating pump been started?
506: Start the ground source side circulating pump whose running time is the shortest
507: Has the user-side circulating pump been started?
508: Start the main machine whose running time is shorter
509: Has the main machine been started?
510: Main machine start program ends
601: Main machine stop program starts
602: Stop the main machine whose running time is longer
603: Has the main machine been stopped?
604: Stop the ground source side circulating pump whose running time is the longest
605: Has the ground source side circulating pump been stopped?
606: Is only one user-side circulating pump running?
607: Does present condition allow main machine to be started?
608: Stop the user-side circulating pump whose running time is the longest
609: Has the user-side circulating pump been stopped?
610: Stop the electric valves corresponding to the main machine
611: Have the electric valves corresponding to the main machine been closed to the preset position?
612: Main machine stop program ends
Preferred Embodiment Of The Present Invention

EXAMPLE 1

Figure 2:
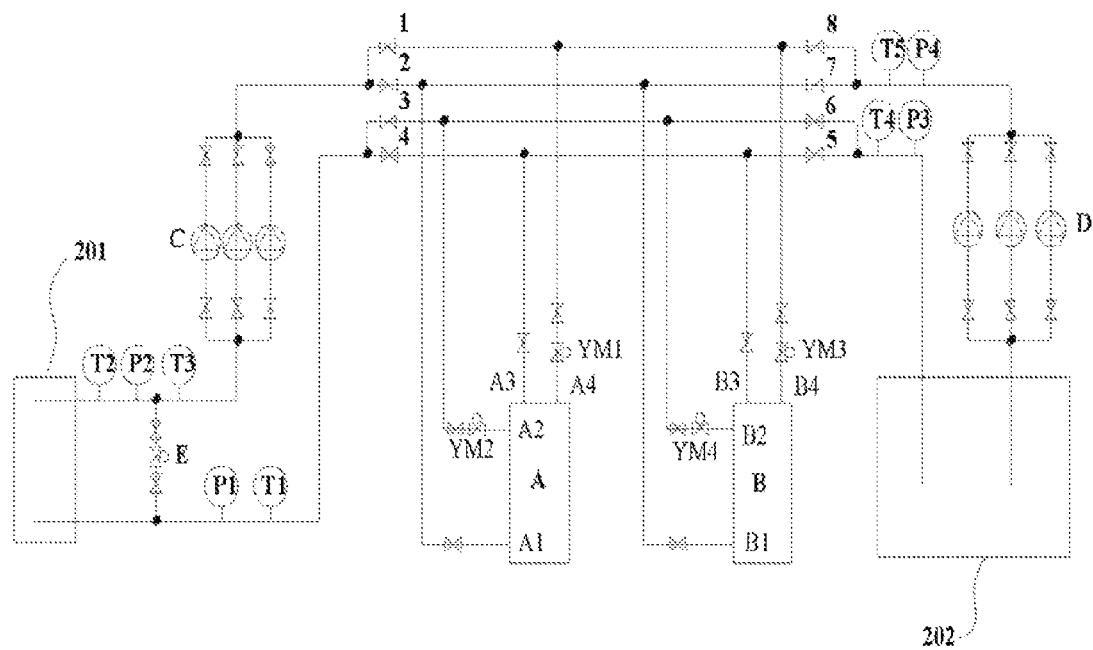
FIG. 2 is a structural sketch of the ground source heat pump integrated controller main module of the present invention.
Figure 3:
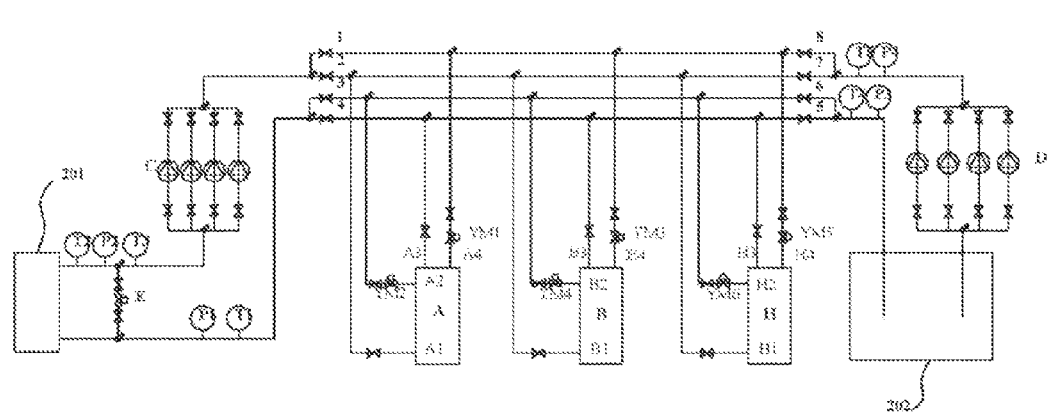
FIG. 3 is a structural sketch of the ground source heat pump integrated controller main module (in connection with the extended module) of the present invention.

A ground source heat pump integrated controller is shown in FIGS. 1-3 as an example of embodiment of the present invention, which comprises a main module 101 that has pre-integrated multiple main machines, pumps and valves according to the rated load of the main module and a number of extended modules 103 that have pre-integrated multiple main machines, pumps and valves according to the rated load of the extended modules, said main module 101 and extended modules 103 both being provided with a plurality of analog contacts and digital contacts, and said extended modules 103 being connected, via the analog and digital contacts, to the main module 101 according to the load of the ground source heat pump system.

The ground source heat pump integrated controller includes main module 101 and extended modules 103. Wherein, main module 101 has integrated analog contacts and digital contacts that control a plurality of main machines, water pumps and valves; and extended modules 103 have also integrated analog contacts and digital contacts of a plurality of main machines, water pumps and valves. After system load is calculated according to the floor area of the building, multiple extended modules are connected to one main module, which increases the capacity of the main module and thus meets the requirement of system load. The ground source heat pump integrated controller directly connects the pre-integrated main module to the pre-integrated extended modules, without the need for additional programming.

When the ground source heat pump integrated controller is in operation, the extended modules are controlled by the main module in which an operating program has been embedded. When multiple extended modules are integrated onto the main module, the main module's control over the extended modules can be realized only by adjusting the latter's operating parameters, without the need to re-write the operating program after multiple devices have been configured into the ground source heat pump system, as is the case with the prior art. For this reason, the ground source heat pump integrated controller of the present invention is simple to control and easy to use.

Main module 101 includes main machine A; main machine B; electric valves YM1, YM2, YM3 and YM4; butterfly valves 1, 2, 3, 4, 5, 6, 7 and 8; user side circulating pump set C; and ground source side circulating pump set D.

Main machine A is provided with cooling water outlet A4, cooling water inlet A3, chilled water outlet A2 and chilled water inlet A1; cooling water outlet A4 is connected, via electric valve YM1 and butterfly valve 1, to user side circulating pump set C; cooling water outlet A4 is connected, via electric valve YM1 and butterfly valve 8, to ground source side circulating pump set D; cooling water inlet A3 is connected, via butterfly valve 5, to the ground source side water supply pipe; cooling water inlet A3 is connected, via butterfly valve 4, to the water supply pipe of user side 201; chilled water outlet A2 is connected, via electric valve YM2 and butterfly valve 6, to the water supply pipe of ground source side 202; chilled water outlet A2 is connected, via electric valve YM2 and butterfly valve 3, to the water supply pipe of user side 201; chilled water inlet A1 is connected, via butterfly valve 7, to ground source side circulating pump set D; and chilled water inlet A1 is connected, via butterfly valve 2, to user side circulating pump set C;

Main machine B is provided with cooling water outlet B4, cooling water inlet B3, chilled water outlet B2 and chilled water inlet B1; said cooling water outlet B4 is connected, via electric valve YM3 and butterfly valve 1, to said user side circulating pump set C; said cooling water outlet B4 is connected, via electric valve YM3 and butterfly valve 8, to said ground source side circulating pump set D; said cooling water inlet B3 is connected, via butterfly valve 5, to the water supply pipe of ground source side 202; said cooling water inlet B3 is connected, via butterfly valve 4, to the water supply pipe of user side 201; said chilled water outlet B2 is connected, via electric valve YM4 and butterfly valve 6, to the water supply pipe of ground source side 202; said chilled water outlet B2 is connected, via electric valve YM4 and butterfly valve 3, to the water supply pipe of user side 201; said chilled water inlet B1 is connected, via butterfly valve 7, to said ground source side circulating pump set D; and said chilled water inlet B1 is connected, via butterfly valve 2, to said user side circulating pump set C;

User side circulating pump set C is connected to the water return pipe of user side 201; said ground source side circulating pump set D is connected to the water return pipe of ground source side 202.

When main module 101 is in operation, the start-up procedures are as follows for main machine A:

First, main module 101 starts electric valve YM1 and electric valve YM2; when electric valve YM1 and electric valve YM2 have opened to the preset position, main module 101 starts timing, and when the preset time is reached, main module 101 starts one of the ground source side circulating pumps in the ground source side circulating pump set D; when the ground source side circulating pump has been working for a certain period of time, main module 101 starts one of the user side circulating pumps in the user side circulating pump set C, and finally starts main machine A. Such a starting mode can reduce the impact of equipment start-up on the voltage of the power grid by avoiding simultaneous start-up of multiple pieces of equipment.

When main module 101 stops, first it puts main machine A to a stop, and then it begins timing. When user side circulating pump has been working for a preset period of time, main module 101 will put it to a stop; when ground source side circulating pump has also been working for a preset period of time, main module 101 will also put it to a stop; and finally both electric valve YM1 and electric valve YM2 stop working. Of course, the procedures for starting/stopping main machine B are the same as those for starting/stopping main machine A. In addition, when main module 101 is being started or stopped, the number of main machines that are working shall be the same as the number of ground source side circulating pumps that are working. Otherwise, there will be a big pressure difference between the main machine side and the ground source side, leading to energy waste and reducing the efficiency of main machine rotation.

More preferably, when main module 101 is in operation, the device with the shortest operation time is started first, and the device with the longest operation time is stopped first. This way, the operation time and abrasion of each device of the main module will be uniform and the service life of the main module will be longer, preventing individual devices from working for too long and thus leading to equipment damages.

User side circulating pump set C consists of three circulating pumps, of which two are in use and one is in standby. Switching among the three pumps can be controlled via a pump relay.

User side circulating pump set C is controlled by means of frequency conversion. To realize this, main module 101 also includes proportional regulating valve E, and pressure gauges P1 and P2; two ends of said proportional regulating valve E are connected respectively to the water return pipe and water supply pipe of user side 201; said pressure gauge P1 is fitted to the water supply pipe of user side 201; and said pressure gauge P2 is fitted to the water return pipe of user side 201. Specifically, when user side circulating pump set C is in operation, the pressure difference between pressure gauge P1 and pressure gauge P2 should remain stable. When the load of user side 201 is relatively low, the frequency of user side circulating pump can be reduced so that the pressure difference between pressure gauge P1 and pressure gauge P2 can remain unchanged. When the frequency of user side circulating pump has reached its minimum, proportional regulating valve E should be opened wider so as to ensure that the pressure difference between pressure gauge P1 and pressure gauge P2 remains unchanged. Of course, water in the water supply pipe of user side 201 flows, via proportional regulating valve E, into the water return pipe of user side 201, which reduces energy loss in the long distance of water transmission to user side 201, thus saving energy and protecting the environment.

Furthermore, main module 101 includes pressure gauges P3 and P4 and five temperature sensors. Said pressure gauge P3 and said pressure gauge P4 are respectively fitted to the water supply pipe and water return pipe of said ground source side 202. Said temperature sensor T1 is fitted to the water supply pipe of user side 201; temperature sensor T4 is fitted to the water supply pipe of ground source side 202; temperature sensor T5 is fitted to the water return pipe of ground source side 202; fitted to the water return pipe of user side 201 are temperature sensors T2 and T3 each of which is on one side of the interconnecting piece where the water return pipe is connected to proportional regulating valve E. Specifically, pressure gauge P3 and pressure gauge P4 are respectively used to measure the return water pressure of the water return pipe and the water supply pressure of the water supply pipe of ground source side 202. When any abnormal water supply pressure or return water pressure of ground source side 202 is detected, main module 101 will start or stop the corresponding device so that main module 101 can work smoothly. In addition, temperature sensor T3 is used to measure the water temperature in front of proportional regulating valve E on the water return pipe; and temperature sensor T2 is used to measure the water temperature behind proportional regulating valve E on the water return pipe.

Said extended module 103 includes an extended main machine H, extended electric valves YM5 and YM6, user side extended circulating pump, and ground source side extended circulating pump. Extended electric valves YM5 and YM6 are respectively installed on cooling water outlet H4 and chilled water outlet H2 of extended main machine H; user side extended circulating pump is connected to user side circulating pump set C in parallel; and ground source side extended circulating pump is connected to ground source side circulating pump set D also in parallel. Specifically, when main module 101 is unable to bear the actual load, it will start the extended main machine, extended electric valve and extended circulating pump in extended module 103 to increase the power of main module 101 and ensure its smooth operation.

Main module 101 is provided with multiple main module communication ports 105; and extended module 103 is provided with multiple extended module communication ports 102 each of which is connected to one of the main module communication ports 105. Wherein, said main module communication ports 105 can be touch-screen communication ports, TCP/IP network communication ports, RS485 communication ports, mobile wireless Internet communication port, SD memory card communication ports, or any other forms of communication ports that match extended module communication port 102.

Furthermore, the ground source heat pump integrated controller also includes a human-machine interaction device 104 which is connected to one of the main module communication ports 105. Functions of said human-machine interaction device 104 include displaying the system graph parameter interface, detailed data monitoring interface, data curves, parameter modifications, energy consumption analysis, and working condition strategies. Wherein, displaying the system graph parameter interface is the basic function of the human-machine interaction device, and the user can judge the system's operation condition according to the temperature, pressure and other operation parameters of each device shown on the system graph, such as main machines, pumps and valves. Traditional system graph interfaces use 2D views to display system operation condition which are neither intuitive nor neat-looking. This example of embodiment adopts 3D views to show system operation conditions, making the system more competitive.

Moreover, the ground source heat pump integrated controller also has an outdoor temperature cut-off function for winter and summer seasons, as well as an anti-freezing function for winter season. When outdoor temperature is lower than indoor temperature in summer, the system can be automatically cut off to save energy. When outdoor temperature is higher than indoor temperature in winter, the system can also be automatically cut off to save energy.

In addition, main module 101 is provided with a motherboard 107; and each main module communication port 105 is connected to motherboard 107. In other words, motherboard 107 in main module 101 communicates with extended module 103 via main module communication ports 105, thus realizing its control over main module 101 and extended module 103. Motherboard 107 can be powered by a 24V DC power source, with a power consumption of 12 VA. In addition, the digital ports of motherboard 107 adopt dry contacts and external signals are isolated using an intermediate relay whose rated current is 1 A. The analog ports of motherboard 107 are respectively connected to temperature sensors and pressure sensors; and said analog ports may opt to use pluggable connector terminals.

Further, main module 101 is provided with a memory unit 106 which is connected to motherboard 107 and used to store the operation data of the ground source heat pump integrated controller. Memory unit 106 can be an SD memory card for storing the entire system's operation data, making it possible for users to view historical data through a touch screen instead of through the network, and thus saving network traffic and operation cost.

Furthermore, main module 101 also includes wireless communication module 108 which is connected to motherboard 107. That means the ground source heat pump integrated controller may be accessed to a wireless network via a wireless communication module so as to be able to transmit data where there is no wired network.

Figure 4:
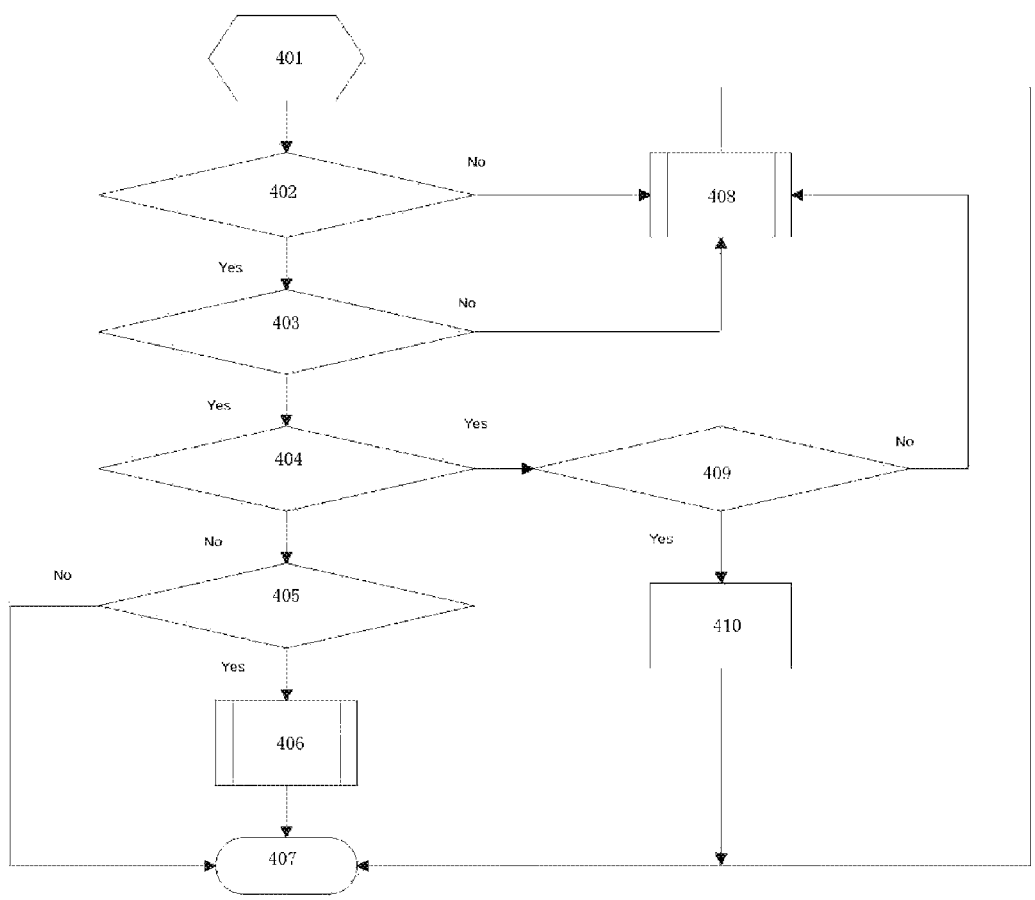
FIG. 4 is the first flow chart showing the embodiment method of ground source heat pump integrated controller of the present invention.
Figure 5:
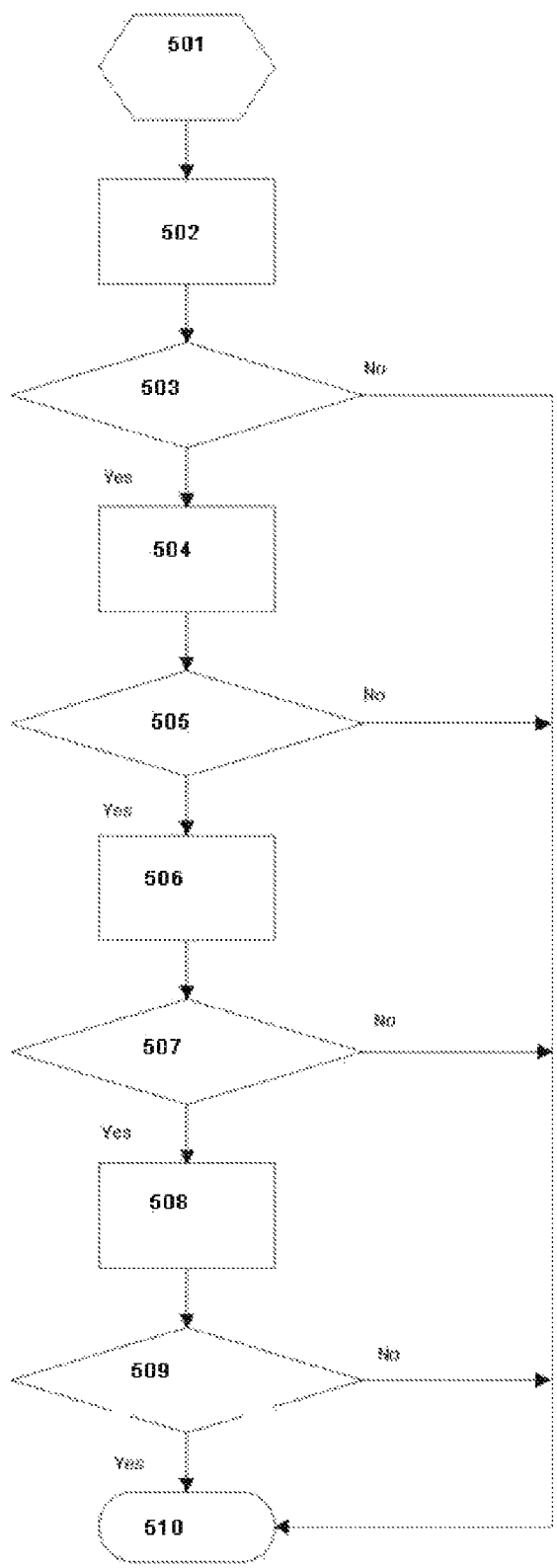
FIG. 5 is the second flow chart showing the embodiment method of ground source heat pump integrated controller of the present invention.
Figure 6:
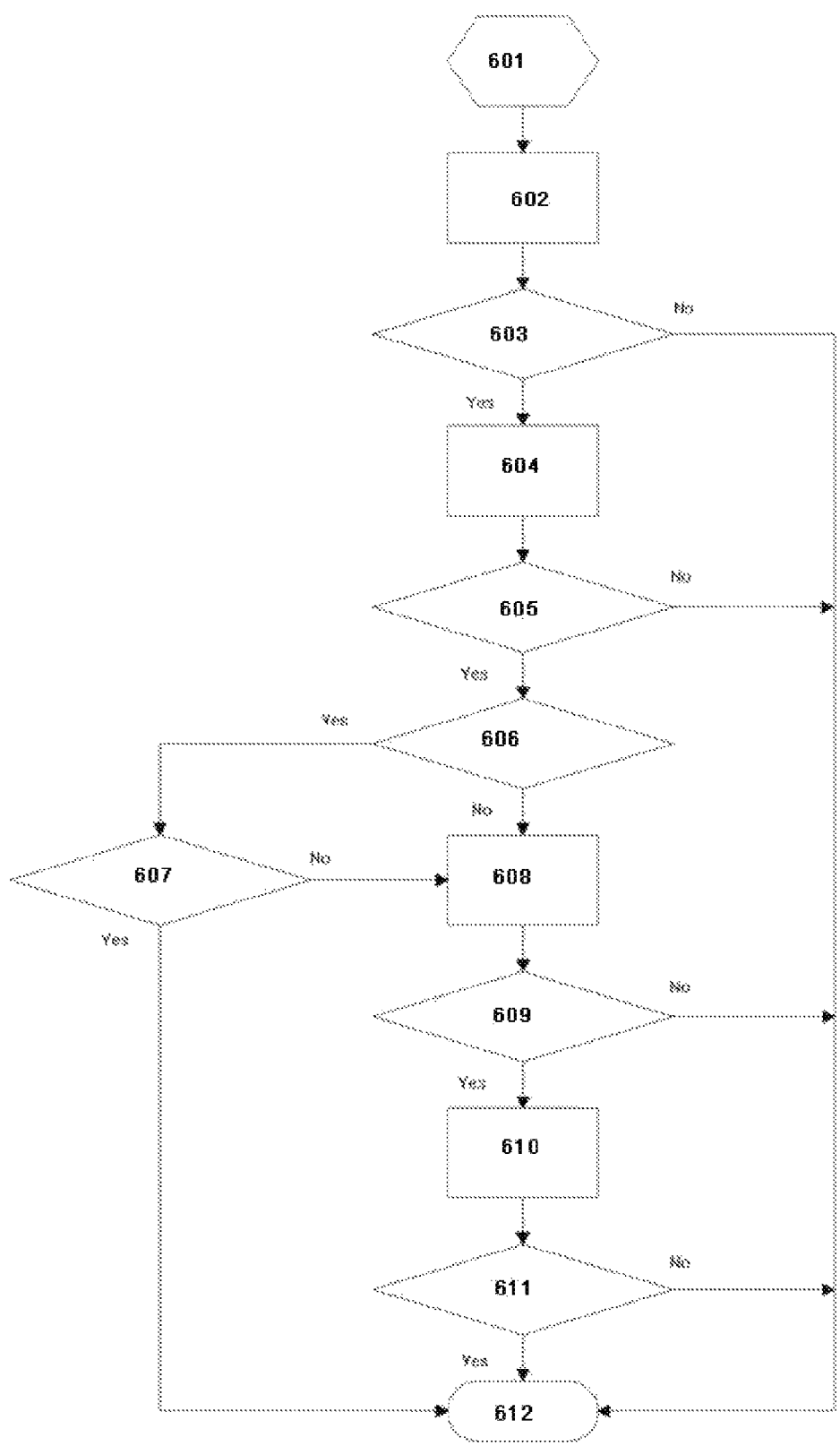
FIG. 6 is the third flow chart showing the embodiment method of ground source heat pump integrated controller of the present invention.

As shown in FIGS. 4-6, the procedures of embodiment of the ground source heat pump integrated controller of the present invention are as follows:

After the ground source heat pump integrated controller is electrified, set it to the auto mode, set the time to start and stop, and set the winter/summer mode via human-machine interaction device 104;

The time for start and stop is set on a weekly basis, where four time periods are set for each day and system start/stop is set for each time period.

First, the ground source heat pump integrated controller runs the main program, as shown in FIG. 4:

Main machine is allowed to be started at the present moment: the return water temperature of user side 201 measured by temperature sensor T3 meets the condition for starting main machine. In summer, when the temperature of user-side return water is higher than the set temperature, the condition for starting main machine is met; in winter, when the temperature of user-side return water is lower than the set temperature, the condition for starting main machine is met; if the present condition does not allow main machine to be started, then the main machine stop program is invoked.

Whether the running equipment has any fault: If the equipment has no fault, there will be devices that can be started, which means at least one of main machine A and main machine B is in the idle state and can be started normally, at least one of the pumps of user side circulating pump set C is in the idle state and can be started normally, and at least one of the pumps of ground source side circulating pump set D is in the idle state and can be started normally. In this case, the main machine start program is invoked and the main program is ended. If the equipment has any fault, it will feed back a digital signal; if there is a standby device, it will be started; if there is no standby device, the main machine stop program will be invoked.

The Main Machine Start Program is Shown in FIG. 5.

First, by comparing the running time of main machine A and main machine B, the one with shorter running time is selected and the electric valves corresponding to this main machine are started; electric valves YM1 and YM2 correspond to main machine A; electric valves YM3 and YM4 correspond to main machine B.

When electric valves YM1, YM2, YM3 and YM4 have fully opened to the preset position, a corresponding digital signal will be fed back; by comparing the running time of the pumps of user side circulating pump set C, the one with the shortest running time is selected and started, then the main machine with shorter running time is started, and finally the main machine start program is ended.

The Main Machine Stop Program is Shown in FIG. 6.

By comparing the running time of main machine A and main machine B, the one with longer running time is selected and stopped; then, by comparing the running time of the pumps of user side circulating pump set C, the one with the longest running time is selected and the ground source side circulating pump with the longest running time is stopped; if more than one user side circulating pump is running or the present condition does not allow main machine to be started, the user side circulating pump with the longest running time will be stopped; then the electric valves corresponding to the main machine are stopped; when the electric valves corresponding to the main machine are closed to the preset position, the main machine stop program is ended; if only one user side circulating pump is running and the present condition allows main machine to be started, then main machine stop program is directly ended.

The above is only a preferred embodiment of the present invention, not intended to restrict the invention. For those skilled in the art, the above exemplary embodiment can be easily adapted or modified to suit specific applications without departing from the fundamentals and scope of this invention. Any and all modifications, equivalent replacements or improvements within the spirit and principle of this invention fall into the protection scope of the present invention.

INDUSTRIAL APPLICABILITY

The present invention comprises a main module and a number of extended modules, in which the main module has integrated analog contacts and digital contacts that control multiple main machines, water pumps and valves, and the extended modules have also integrated analog contacts and digital contacts that control multiple main machines, water pumps and valves. After system load is calculated according to the floor area of the building, multiple extended modules are connected to one main module, which increases the capacity of the main module and thus meets the requirement of system load. The ground source heat pump integrated controller directly connects the pre-integrated main module to the pre-integrated extended modules, which does not require additional programming and thus achieves better scalability and flexibility. Moreover, the ground source heat pump integrated controller of the present invention also has an outdoor temperature cut-off function for winter and summer seasons, as well as an anti-freezing function for winter season. When outdoor temperature is lower than indoor temperature in summer, the system can be automatically cut off to save energy. When outdoor temperature is higher than indoor temperature in winter, the system can also be automatically cut off to save energy.

The invention claimed is:

1. A ground source heat pump integrated controller, comprising:
   a main module that has pre-integrated multiple main machines, pumps and valves according to a rated load of the main module; and
   a plurality of extended modules that have pre-integrated multiple main machines, pumps and valves according to a rated load of the plurality of extended modules,
   said main module and said plurality of extended modules both being provided with a plurality of analog contacts and digital contacts, and
   said plurality of extended modules being connected, via the analog and digital contacts, to the main module according to the load of the ground source heat pump system,
   wherein said main module includes:
      a first main machine and a second main machine;
      first, second, third and fourth electric valves;
      first, second, third, fourth, fifth, sixth, seventh and eighth butterfly valves;
      a user side circulating pump set; and
      a ground source side circulating pump set,
   said first main machine is provided with a first cooling water outlet, a first cooling water inlet, a first chilled water outlet and a first chilled water inlet,
      said first cooling water outlet is connected, via said first electric valve and said first butterfly valve, to said user side circulating pump set,
      said first cooling water outlet is connected, via said first electric valve and said eighth butterfly valve, to said ground source side circulating pump set,
      said first cooling water inlet is connected, via said fifth butterfly valve, to a ground source side water supply pipe,
      said first cooling water inlet is connected, via said fourth butterfly valve, to a user side water supply pipe,
      said first chilled water outlet is connected, via said second electric valve and said sixth butterfly valve, to said ground source side water supply pipe,
      said first chilled water outlet is connected, via said second electric valve and said third butterfly valve, to said user side water supply pipe,
      said first chilled water inlet is connected, via said seventh butterfly valve, to said ground source side circulating pump set, and
      said first chilled water inlet is connected, via said second butterfly valve, to said user side circulating pump set,
   said second main machine is provided with a second cooling water outlet, a second cooling water inlet, a second chilled water outlet and a second chilled water inlet,
      said second cooling water outlet is connected, via said third electric valve and said first butterfly valve, to said user side circulating pump set,
      said second cooling water outlet is connected, via said third electric valve and said eighth butterfly valve, to said ground source side circulating pump set,
      said second cooling water inlet is connected, via said fifth butterfly valve, to said ground source side water supply pipe,
      said second cooling water inlet is connected, via said fourth butterfly valve, to said user side water supply pipe,
      said second chilled water outlet is connected, via said fourth electric valve and said sixth butterfly valve, to said ground source side water supply pipe,
      said second chilled water outlet is connected, via said fourth electric valve and said third butterfly valve, to said user side water supply pipe,
      said second chilled water inlet is connected, via said seventh butterfly valve, to said ground source side circulating pump set, and
      said second chilled water inlet is connected, via said second butterfly valve, to said user side circulating pump set,
   said user side circulating pump set is connected to a user side water return pipe, and
   said ground source side circulating pump set is connected to a ground source side water return pipe.

2. A ground source heat pump integrated controller according to claim 1, wherein
   said main module also includes:
      a proportional regulating valve; and
      first and second pressure gauges, wherein
   two ends of said proportional regulating valve are respectively connected to said user side water return pipe and said user side water supply pipe,
   said first pressure gauge is fitted to said user side water supply pipe, and
   said second pressure gauge is fitted to said user side water return pipe.

3. A ground source heat pump integrated controller according to claim 2, wherein
   said main module also includes:
      third and fourth pressure gauges; and
      first, second, third, fourth and fifth temperature sensors, wherein
   said third pressure gauge and said fourth pressure gauge are respectively fitted to said ground source side water supply pipe and said ground source side water return pipe,
   said first temperature sensor is fitted to said user side water supply pipe,
   said fourth temperature sensor is fitted to said ground source side water supply pipe,
   said fifth temperature sensor is fitted to said ground source side water return pipe, and
   said second and third temperature sensors are fitted to said user side water return pipe, each of said second and third temperature sensors is on one side of an interconnecting piece where said user side water return pipe is connected to said proportional regulating valve.

4. A ground source heat pump integrated controller according to claim 1, wherein each of said plurality of extended modules includes:
  an extended main machine;
  first and second extended electric valves;
  a plurality of user side extended circulating pumps; and
  a plurality of ground source side extended circulating pumps,
wherein said first and second extended electric valves are respectively installed on a third cooling water outlet and a third chilled water outlet of said extended main machine,
said plurality of user side extended circulating pumps are connected to said user side circulating pump set in parallel, and
said plurality of ground source side extended circulating pumps are connected to said ground source side circulating pump set in parallel.

5. A ground source heat pump integrated controller according to claim 1, wherein said main module is provided with a motherboard which is connected to a main module communication port which is then connected to an extended module communication port.

6. A ground source heat pump integrated controller according to claim 5, wherein said main module communication port is connected to a human-machine interaction device configured to display a system graph parameter interface, a detailed data monitoring interface, data curves, parameter modifications, an energy consumption analysis, and working condition strategies.

7. A ground source heat pump integrated controller according to claim 1, wherein said main module is also provided with a memory unit which is connected to a motherboard for storing operation data of the ground source heat pump integrated controller.

8. A ground source heat pump integrated controller according to claim 1, wherein said main module is also provided with a wireless communication module which is connected to a motherboard.

* * * * *